US012767811B2

(12) United States Patent
Tanaka

(10) Patent No.: US 12,767,811 B2
(45) Date of Patent: Oct. 20, 2026

(54) FINE RESIN PARTICLE AND FINE RESIN PARTICLE-CONTAINING COMPOSITION

(71) Applicant: SEKISUI KASEI CO., LTD., Osaka (JP)

(72) Inventor: Kohei Tanaka, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 592 days.

(21) Appl. No.: 18/277,259

(22) PCT Filed: Feb. 10, 2022

(86) PCT No.: PCT/JP2022/005278
§ 371 (c)(1),
(2) Date: Aug. 15, 2023

(87) PCT Pub. No.: WO2022/181349
PCT Pub. Date: Sep. 1, 2022

(65) Prior Publication Data

US 2024/0124702 A1 Apr. 18, 2024

(30) Foreign Application Priority Data

Feb. 26, 2021 (JP) ................................ 2021-030954

(51) Int. Cl.

| | |
|---|---|
| ***C08F 2/46*** | (2006.01) |
| ***C08F 2/50*** | (2006.01) |
| ***C08F 22/10*** | (2006.01) |
| ***C08F 265/06*** | (2006.01) |
| ***C08G 61/04*** | (2006.01) |
| ***C08L 35/02*** | (2006.01) |
| ***C08L 51/00*** | (2006.01) |

(52) U.S. Cl.
CPC ........ *C08L 51/006* (2013.01); *C08F 22/1006* (2020.02); *C08F 265/06* (2013.01); *C08L 35/02* (2013.01)

(58) Field of Classification Search
CPC ........ C08F 2/50; C08F 22/006; C08F 220/14; C08F 222/102; C08F 265/06; C08F 212/08; C08L 51/006; C08L 35/02; C09D 133/08
USPC ....... 522/112, 111, 1, 6, 71, 189, 184; 520/1
See application file for complete search history.

(56) References Cited

U.S. PATENT DOCUMENTS

| | | | | |
|---|---|---|---|---|
| 5,766,324 A * | 6/1998 | Ikegaya | ................. C09D 11/50 283/88 |
| 2013/0266797 A1 | 10/2013 | Teramoto et al. | |
| 2015/0004127 A1 | 1/2015 | Ishimori et al. | |
| 2015/0030842 A1 * | 1/2015 | Hama | ................ B01J 20/28061 502/402 |
| 2021/0002497 A1 | 1/2021 | Iga et al. | |

FOREIGN PATENT DOCUMENTS

| | | |
|---|---|---|
| JP | 2010-195992 | 9/2010 |
| JP | 5011731 | 8/2012 |
| JP | 2013-227535 | 11/2013 |
| JP | 2015-004007 | 1/2015 |
| JP | 5689011 | 3/2015 |
| JP | 2017-181990 | 10/2017 |
| JP | 6258740 | 1/2018 |
| JP | 2018-62583 | 4/2018 |
| WO | 2013/114653 | 8/2013 |
| WO | 2014/050177 | 4/2014 |
| WO | 2019/188996 | 10/2019 |

OTHER PUBLICATIONS

International Preliminary Report on Patentability issued Aug. 29, 2023 in corresponding International (PCT) Patent Application No. PCT/JP2022/005278, with English language translation.
Extended European Search Report issued Jan. 24, 2025 in corresponding European Patent Application No. 22759388.6.
Office Action issued Jul. 16, 2024 in Japanese Patent Application No. 2021-030954, with English-language Translation.
International Search Report (ISR) issued Mar. 29, 2022 in International (PCT) Application No. PCT/JP2022/005278.

* cited by examiner

*Primary Examiner* — Jessica Whiteley
(74) *Attorney, Agent, or Firm* — Wenderoth, Lind & Ponack, L.L.P.

(57) ABSTRACT

A problem is to provide a fine resin particle formed by a simple method and capable of preventing fine resin particles from dropping out from substrates or binders and imparting scratch resistance to films, and a fine resin particle-containing composition. A solution is to provide a fine resin particle obtained by polymerizing one or two or more vinylic monomers and, in an infrared spectrum measured by an ATR method with an infrared spectrophotometer, having an absorbance ratio (B)/(A) in a range of 0.020 to 0.060 between the maximum peak height (maximum absorbance) (A) in a wavenumber range from 1700 $cm^{-1}$ to 1800 $cm^{-1}$ and the maximum peak height (maximum absorbance) (B) in a wavenumber range from 1600 $cm^{-1}$ to 1700 $cm^{-1}$.

5 Claims, No Drawings

FINE RESIN PARTICLE AND FINE RESIN PARTICLE-CONTAINING COMPOSITION

CROSS-REFERENCE TO RELATED APPLICATIONS

This application is the U.S. National Phase under 35 U.S.C. § 371 of International Application PCT/JP2022/005278, filed Feb. 10, 2022, which claims priority to Japanese Patent Application No. JP 2021-030954, filed Feb. 26, 2021. The International Application was published under PCT Article 21 (2) in a language other than English.

TECHNICAL FIELD

The present invention relates to a fine resin particle obtained by polymerizing vinylic monomers and a fine resin particle-containing composition.

BACKGROUND ART

Fine resin particles have continued to expand their applications in recent years and are used in a wide variety of applications, such as additives for resin films, spacer applications between micro sites of various electronic devices, pore-forming agents for various battery members, or core particles of fine conductive particles responsible for electrical connections.

Among these, as additives for resin films, additives for resin films used in the applications of optical members, such as light diffusion films or anti-glare films, or electronic devices, anti-blocking agents such as various resin films, modifiers for various resin films, and the like may be mentioned.

Resin films used for optical members, electronic devices, etc., are required to have sophisticated properties. Typical properties include anti-sticking property, high transparency, high durability, anti-scratch property (scratch resistance), and the like. These properties are imparted in various ways, for example, directly to a substrate film or in a post-process such as coating.

Among these characteristics, the anti-sticking property is a key characteristic for preventing sticking between resin films at overlapping areas and preventing deterioration of slipperiness and detachability of resin films when the resin film is stored in a rolled state. To address the issue of imparting the anti-sticking property to resin films, it is known to add fine resin particles or inorganic particles as anti-sticking agents.

Examples of anti-sticking agents include inorganic particles such as silica, fine resin particles such as fine (meth) acrylic-based resin particles, and the like.

Silica is advantageous in its high hardness and can impart anti-sticking properties when added in a small amount. However, a difference in refractive index occurs between silica and a resin film due to the material properties thereof, and disadvantages that may be factors for impairing transparency exist.

Meanwhile, fine resin particles are advantageous in that fine resin particles can be used in resin films or other materials to which high qualities are required because fine resin particles can maintain the transparency of resin films and can impart the anti-sticking property, but are inferior in strength compared to inorganic particles.

PTL 1 discloses crosslinked fine resin particles obtained using a technique for improving the strength side by adding innovations to the crosslinked structure.

PTL 2 indicates that core-shell-type lubricating particles are applied to an optical film, thereby imparting anti-sticking performance while maintaining transparency.

PTL 3 discloses improving affinity to matrix resins by using fine resin particles with at least one reactive functional group selected from the group consisting of a hydroxyl group, an epoxy group, a carboxyl group, and an alkoxysilyl group and an ethylenically unsaturated group.

CITATION LIST

Patent Literature

[PTL 1] Japanese Patent No. 6258740

[PTL 2] Japanese Patent Application Publication No. 2017-181990

[PTL 3] Japanese Patent No. 5011731

SUMMARY OF INVENTION

Technical Problem

However, when used in a film, the crosslinked fine particles disclosed in PTL 1 can impart transparency and anti-sticking performance. However, scratch resistance or the like remained an issue because the particles drop out from substrates or binders. Similarly for the core-shell particles described in PTL 2, the particles drop out, and thus scratch resistance performance has not been imparted. Furthermore, although the reactive monodisperse fine resin particles described in PTL 3 could impart scratch resistance performance, the manufacturing method for the particles was complicated, and there were still issues in terms of production and cost.

An issue of the present invention is to provide a fine resin particle formed by a simple method and capable of preventing fine resin particles from dropping out from substrates or binders and imparting scratch resistance, and a fine resin particle-containing composition.

Solution to Problem

The present inventor has made an intensive study in view of the issue mentioned above and, as a result, found that, although the resin particles are prepared by a simple method, by setting the absorbance ratio of the maximum absorbance in a specific wavenumber range in the infrared spectrum to a specific range, dropping out of fine resin particles from substrates and binders can be suppressed, and fine resin particles capable of imparting scratch resistance to films can be obtained.

That is, the invention is specifically as follows.

[1] A fine resin particle obtained by polymerizing one or two or more vinylic monomers, and, in an infrared spectrum measured by an ATR method with an infrared spectrophotometer, having an absorbance ratio (B)/(A) in a range of 0.020 to 0.060 between a maximum peak height (maximum absorbance) (A) in a wavenumber range from 1700 $cm^{-1}$ to 1800 $cm^{-1}$ and a maximum peak height (maximum absorbance) (B) in a wavenumber range from 1600 $cm^{-1}$ to 1700 $cm^{-1}$.

[2] The fine resin particle according to [1], wherein the vinylic monomers include a multifunctional vinylic monomer.

[3] The fine resin particle according to [1] or [2], wherein the vinylic monomers include a (meth)acrylic acid ester-based monomer.

[4] The fine resin particle according to any one of [1] to [3], wherein a content of the multifunctional vinylic monomer is in a range of 51 parts by mass to 100 parts by mass in relation to 100 parts by mass of the vinylic monomer.

[5] The fine resin particle according to any one of [1] to [4], wherein an amount of unreacted vinylic monomer in the fine resin particle is 1.0% by mass or less.

[6] The fine resin particle according to any one of [1] to [5], wherein the fine resin particle is a dried powder with a moisture content of 2.0% by mass or less.

[7] A fine resin particle-containing composition including the fine resin particle according to any one of [1] to [6], a photo-polymerization initiator, and a UV curable resin.

Advantageous Effects of Invention

The fine resin particle of the present invention can provide a fine resin particle capable of preventing fine resin particles from dropping out from substrates or binders and imparting scratch resistance to films, although it is prepared by a simple method, and a fine resin particle-containing composition.

DESCRIPTION OF EMBODIMENTS

Hereinafter, the fine resin particle and the fine resin particle-containing composition of the present invention will be described in detail.

In the present description, (meth)acrylic acid ester-based monomer means an acrylic acid ester-based monomer or a methacrylic acid ester-based monomer, and (meth)acrylic acid means acrylic acid or methacrylic acid.

[Fine Resin Particle]

The fine resin particle of the present invention is obtained by polymerizing one or two or more vinylic monomers. The vinylic monomers may be one or two or more selected from monofunctional vinylic monomers with one vinyl group in one molecule and multifunctional vinylic monomers with two or more vinyl groups.

<Monofunctional Vinylic Monomer>

Examples of monofunctional vinylic monomers include monofunctional (meth)acrylic monomers, monofunctional aromatic vinylic monomers, fatty acid vinyl ester-based monomers, halogenated olefinic monomers, vinyl cyanide-based monomers, unsaturated carboxylic acid-based monomers, unsaturated polycarboxylic acid ester-based monomers, unsaturated carboxamide-based monomers, unsaturated carboxamide methylolide-based monomer, and the like.

These monofunctional vinylic monomers may be used singly, or two or more thereof may be used as a mixture.

Examples of the monofunctional (meth)acrylic acid ester-based monomers include alkyl(meth)acrylates with a C1-20 alkyl group attached to an ester, such as methyl(meth)acrylate (methyl methacrylate and methyl acrylate), ethyl(meth)acrylate, propyl(meth)acrylate, isopropyl(meth)acrylate, n-butyl(meth)acrylate, isobutyl(meth)acrylate, s-butyl(meth)acrylate, t-butyl(meth)acrylate, pentyl(meth)acrylate, isopentyl(meth)acrylate, hexyl(meth)acrylate, heptyl(meth)acrylate, octyl(meth)acrylate, 2-ethylhexyl(meth)acrylate, isooctyl(meth)acrylate, nonyl(meth)acrylate, isononyl(meth)acrylate, decyl(meth)acrylate, isodecyl(meth)acrylate, undecyl(meth)acrylate, dodecyl(meth)acrylate, tridecyl(meth)acrylate, tetradecyl(meth)acrylate, pentadecyl(meth)acrylate, hexadecyl(meth)acrylate, heptadecyl(meth)acrylate, octadecyl(meth)acrylate, isostearyl(meth)acrylate, nonadecyl(meth)acrylate, and eicosyl(meth)acrylate; (meth)acrylic acid ester having an alicyclic structure in the ester moiety, such cyclohexyl(meth)acrylate, isobornyl(meth)acrylate, and dicyclopentanyl(meth)acrylate; (meth)acrylic acid ester having an epoxy group (glycidyl group) in the ester moiety, such as glycidyl(meth)acrylate; (meth)acrylic acid ester having a hydroxy group in the ester moiety, such as 2-hydroxyethyl(meth)acrylate and 2-hydroxypropyl(meth)acrylate; (meth)acrylic acid ester having an amino group in the ester moiety, such as dimethylaminoethyl(meth)acrylate and diethylaminoethyl(meth)acrylate; and the like.

These monofunctional (meth)acrylic acid ester-based monomers may be used singly, or two or more thereof may be used as a mixture.

Among these monofunctional (meth)acrylic acid ester-based monomers, methyl(meth)acrylate, ethyl(meth)acrylate, propyl(meth)acrylate, isopropyl(meth)acrylate, n-butyl(meth)acrylate, isobutyl(meth)acrylate, s-butyl(meth)acrylate, t-butyl(meth)acrylate, pentyl(meth)acrylate, isopentyl(meth)acrylate, hexyl(meth)acrylate, heptyl(meth)acrylate, octyl(meth)acrylate, 2-ethylhexyl(meth)acrylate, isooctyl(meth)acrylate, nonyl(meth)acrylate, isononyl(meth)acrylate, and decyl(meth)acrylate, which have a C1-10 alkyl group attached to an ester, are preferred because they are generic products. In the application requiring heat resistance, cyclohexyl(meth)acrylate, isobornyl(meth)acrylate, and dicyclopentanyl(meth)acrylate are particularly referred. These monofunctional (meth)acrylic acid ester-based monomers may be used singly, or two or more thereof may be used as a mixture.

Examples of monofunctional aromatic vinylic monomers include styrene, o-methylstyrene, m-methylstyrene, p-methylstyrene (vinyltoluene), ethylvinylbenzene, α-methylstyrene, styrenesulfonate salts such as sodium styrenesulfonate and ammonium styrenesulfonate, vinylnaphthalene, allylbenzene, and the like. Among these, styrene, α-methylstyrene, and sodium styrenesulfonate are preferred. These monofunctional styrene-based monomers may be used singly, or two or more thereof may be used as a mixture.

Examples of fatty acid vinyl ester-based monomers include vinyl acetate, vinyl propionate, and the like. These fatty acid vinyl ester-based monomers may be used singly, or two or more thereof may be used as a mixture.

Examples of halogenated olefinic monomers include vinyl chloride, vinylidene chloride, tetrafluoroethylene, vinylidene fluoride, and the like. These halogenated olefinic monomers may be used singly, or two or more thereof may be used as a mixture.

Examples of vinyl cyanide-based monomers include (meth)acrylonitrile and the like.

Unsaturated carboxylic acid-based monomers include unsaturated carboxylic acids and salts or anhydrides thereof, and examples thereof include (meth)acrylic acid, crotonic acid, maleic acid, and fumaric acid, and ammonium or metal salts thereof, maleic anhydride, and the like. These unsaturated carboxylic acid-based monomers may be used singly, or two or more thereof may be used as a mixture.

Unsaturated polycarboxylic acid ester-based monomers include unsaturated dicarboxylic acid monoesters, salts thereof, and unsaturated dicarboxylic acid diesters, and examples thereof include monobutyl maleate, and ammonium or metal salts thereof, dimethyl maleate, and the like.

These unsaturated polycarboxylic acid ester-based monomers may be used singly, or two or more thereof may be used as a mixture.

Examples of unsaturated carboxamide-based monomers include (meth)acrylamide, diacetone(meth)acrylamide, and the like. These unsaturated carboxamide-based monomers may be used singly, or two or more thereof may be used as a mixture.

Examples of unsaturated carboxamide methylolide-based monomers include N-methylolacrylamide, N-methylolmethacrylamide, methylolated diacetone acrylamide, etherified products of these monomers and C1-8 alcohols, and the like. These unsaturated carboxamide methylolide-based monomers may be used singly, or two or more thereof may be used as a mixture.

<Multifunctional Vinylic Monomer>

Examples of multifunctional vinylic monomers include multifunctional (meth)acrylic monomers, multifunctional aromatic vinylic monomers, multifunctional allylic monomers, and the like.

These multifunctional vinylic monomers may be used singly, or two or more thereof may be used as a mixture.

Examples of multifunctional (meth)acrylic monomers include ethylene glycol di(meth)acrylate, propylene glycol di(meth)acrylate, diethylene glycol di(meth)acrylate, triethylene glycol di(meth)acrylate, decaethylene glycol di(meth)acrylate, pentadecaethylene glycol di(meth)acrylate, pentacontahectaethylene glycol di(meth)acrylate, 1,3-butylene di(meth)acrylate, allyl(meth)acrylate, trimethylolpropane tri(meth)acrylate, pentaerythritol tetraacrylate, and the like. Among these, ethylene glycol di(meth)acrylate and allyl (meth)acrylate are preferred. These multifunctional (meth)acrylic monomers may be used singly, or two or more thereof may be used as a mixture.

Examples of multifunctional aromatic vinylic monomers include divinylbenzene, divinylnaphthalene, derivatives of these in which aromatic rings are substituted with substituents, and the like. These multifunctional aromatic vinylic monomers may be used singly, or two or more thereof may be used as a mixture.

Examples of multifunctional allylic monomers include diallyl phthalate, triallyl cyanurate, and the like. These multifunctional allylic monomers may be used singly, or two or more thereof may be used as a mixture.

<Composition of Fine Resin Particle>

In the present invention, vinylic monomers constituting the fine resin particle are preferred to include a multifunctional vinylic monomer.

In the present invention, vinylic monomers constituting the fine resin particle are preferred to include a (meth)acrylic acid ester-based monomer. Here, the (meth)acrylic acid ester-based monomer is one or two or more selected from the group consisting of monofunctional (meth)acrylic monomers and multifunctional (meth)acrylic monomers.

In the present invention, it is preferred that vinylic monomers constituting the fine resin particle is a mixture of monofunctional vinylic monomers and multifunctional vinylic monomers.

The fine resin particle of the present invention is preferably constituted of at least one resin out of (meth)acrylic resins, styrenic resins, and (meth)acryl-styrene-based resins. This allows the fine resin particles to be constituted of highly light-transmissive fine resin particles.

A (meth)acrylic resin is a resin obtained by polymerizing one or two or more (meth)acrylic acid ester-based monomers or a resin obtained by polymerizing one or two or more (meth)acrylic acid ester-based monomers and one or two or more vinylic monomers other than (meth)acrylic acid ester-based monomers and styrenic monomers.

A styrenic resin is a resin obtained by polymerizing one or two or more styrenic monomers or a resin obtained by polymerizing one or two or more styrenic monomers and one or two or more vinylic monomers other than (meth)acrylic acid ester-based monomers and styrenic monomers.

A (meth)acryl-styrene-based resin is a resin obtained by polymerizing one or two or more (meth)acrylic acid ester-based monomers and one or two or more styrenic monomers or a resin obtained by polymerizing one or two or more (meth)acrylic acid ester-based monomers, one or two or more styrenic monomers, and one or two or more other vinylic monomers.

In the present invention, the multifunctional vinylic monomer content in 100 parts by mass of vinylic monomers constituting the fine resin particle is not particularly limited. For example, in relation to 100 parts by mass of vinylic monomers, the multifunctional vinylic monomer content is 51 parts by mass or more, preferably 60 parts by mass or more, and more preferably 70 parts by mass or more, and, for example, 100 parts by mass or less, and preferably 95 parts by mass or less.

When the multifunctional vinylic monomer content in 100 parts by mass of vinylic monomers constituting the fine resin particle is low, (i) dropping out of fine resin particles from substrates or binders cannot be prevented, (ii) scratch resistance cannot be imparted to films, (iii) in an infrared spectrum measured by an ATR method with an infrared spectrophotometer, the maximum peak height (maximum absorbance) (B) in the wavenumber range from 1600 $cm^{-1}$ to 1700 $cm^{-1}$ does not become high, (iv) the degree of crosslinking of the fine resin particle is low, and when the fine resin particle is mixed with a binder and/or a solvent, the fine resin particle swells, the viscosity increases, and coating workability or other properties become poor, and (v) since the degree of crosslinking of the fine resin particle is low, fine resin particle may easily deform or dissolve when the fine resin particle is mixed with a binder, then heated, and molded.

The fine resin particle of the present invention may contain various additives. For example, the fine resin particle may contain an antioxidant.

Although not particularly limited, examples of antioxidants include sulfur-based antioxidants, phosphorus-based antioxidants, hindered phenolic antioxidants, lactone-based antioxidants, and the like. An antioxidant may be added during the polymerization of fine resin particle.

<Absorbance Ratio>

The absorbance ratio is calculated by determining the maximum peak height (maximum absorbance) (A) in a wavenumber range from 1700 $cm^{-1}$ to 1800 $cm^{-1}$ (hereinafter also referred to as "absorbance (A)") and the maximum peak height (maximum absorbance) (B) in a wavenumber range from 1600 $cm^{-1}$ to 1700 $cm^{-1}$ (hereinafter also referred to as "absorbance (B)"), which are obtained from an infrared spectrum of resin fine particles measured by an ATR method with an infrared spectrophotometer, and then calculating the absorbance ratio from the following (Formula 1).

$$\text{Absorbance ratio}=(B)/(A) \quad \text{(Formula 1)}$$

The absorbance (A) is an absorbance corresponding to the absorption spectrum mainly derived from the C═O stretching vibration of ester groups. It should be noted that peak separation is not performed even if other absorption spectra overlap in the range from 1700 $cm^{-1}$ to 1800 $cm^{-1}$. Meanwhile, the absorbance (A) means the maximum absorbance between 1700 $cm^{-1}$ and 1800 $cm^{-1}$ determined by setting a straight line connecting 1700 $cm^{-1}$ and 1800 $cm^{-1}$ to the baseline.

The absorbance (B) is an absorbance corresponding to the absorption spectrum mainly derived from the alkene C≡C stretching vibration. It should be noted that peak separation is not performed even if other absorption spectra overlap in the range from 1600 $cm^{-1}$ to 1700 $cm^{-1}$. Meanwhile, the absorbance (B) means the maximum absorbance between 1600 $cm^{-1}$ and 1700 $cm^{-1}$ determined by setting a straight line connecting 1600 $cm^{-1}$ and 1700 $cm^{-1}$ to the baseline.

In the present invention, the absorbance (A) and the absorbance (B) may be determined, for example, by the method described in the section of [Examples].

The absorbance ratio of the fine resin particle of the present invention is 0.020 or higher and preferably 0.025 or higher and is 0.060 or lower and preferably 0.055 or lower. If the absorbance ratio is lower than 0.020, the fine resin particles may drop out from substrates or binders, and scratch resistance may not be imparted to films. If the absorbance ratio is higher than 0.060, the fine resin particles may agglomerate and drop out from substrates or binders, and scratch resistance may not be imparted to films.

Although not particularly limited, the absorbance (B) of the fine resin particle of the present invention is, for example, 0.0040 or higher and preferably 0.0045 or higher and is, for example, 0.0120 or lower and preferably 0.0100 or lower.

<Unreacted Vinylic Monomer Amount in Fine Resin Particle>

The unreacted vinylic monomer amount in the fine resin particle is not particularly limited. For example, with the amount of all vinylic monomers used in the preparation of fine resin particles as 100% by mass, the unreacted vinylic monomer amount is 1.0% by mass or less, preferably 0.9% by mass or less, and more preferably 0.8% by mass or less. If the unreacted vinylic monomer amount is more than 1.0% by mass, some problems, such as degradation of optical properties, generation of residual odor, environmental contamination, and generation of foreign matters (resin drool, etc.) when fine resin particulates are used, may occur.

In the present invention, the unreacted vinylic monomer amount in the fine resin particle may be determined, for example, by the method described in the section of [Examples].

<Moisture Content>

The moisture content in the fine resin particle is not particularly limited, but a dried one with low moisture content is preferred. For example, with the entire fine resin particles as 100% by mass, the moisture content is preferably 2.0% by mass or less, preferably 1.0% by mass or less, and more preferably 0.5% by mass or less. If the moisture content is more than 2.0% by mass, unevenness, etc., may occur when the fine resin particle-containing composition is molded or a coating film is formed, and problems such as deterioration of the optical characteristics, etc., may occur.

In the present invention, the moisture content of the fine resin particle may be determined, for example, by the method described in the section of [Examples].

<Volume Average Particle Size>

The volume average particle size of the fine resin particles in the present invention is not particularly limited. The volume average particle size is, for example, 0.01 μm or larger and preferably 0.1 μm or larger, and for example, 20 μm or smaller, preferably 15 μm or smaller, and more preferably 10 μm or smaller. Fine resin particles with a volume average particle size within such a range can increase optical characteristics when the fine resin particle is used as a film additive.

In the present invention, the volume average particle size of the fine resin particles shall refer to, for example, an arithmetic mean of particle sizes on the volume basis obtained by the method described in the section of [Examples].

<Coefficient of Variation of Particle Sizes of Fine Resin Particle>

In the present invention, the coefficient of variation of the particle sizes is not particularly limited. The coefficient of variation of the particle sizes is, for example, 35.0% or less, and preferably 33.0% or less. Fine resin particles with a coefficient of variation of particle sizes within such a range can further increase the dispersion uniformity of the fine resin particle.

The coefficient of variation of the particle sizes of the fine resin particles of the present invention can be determined by the following formula.

Coefficient of variation of particle size of fine resin particles=[(Standard deviation of volume-based particle size distribution of fine resin particles)/(Volume average particle size of fine resin particles)]×100

<Residual Surfactant Amount>

The residual surfactant amount in relation to 100 parts by mass of the fine resin particle of the present invention is not particularly limited and is set as appropriate according to the purposes and uses. The residual surfactant amount is in the range of, for example, 0.01 parts by mass or more, preferably 0.03 parts by mass or more, and more preferably 0.05 parts by mass or more, and for example, 1 part by mass or less, preferably 0.7 parts by mass or less, and more preferably 0.5 parts by mass or less.

When a surfactant is used during polymerization, reducing the residual surfactant amount to less than 0.01 parts by mass may complicate the process and be disadvantageous in terms of cost and other respects. If the residual surfactant amount is more than 1 part by mass, free surfactants exist when the fine resin particle is mixed in a coating composition, and the particle tends to drop out easily.

In the present invention, the residual surfactant amount may be determined, for example, by the method described in the section of [Examples].

[Production Method of Fine Resin Particle]

The production method of the fine resin particle of the present invention is not particularly limited. For example, a preferred method includes (i) a polymerization step in which a vinylic monomer is polymerized in a liquid medium under the presence of a surfactant and a polymerization initiator to prepare a crude product containing fine resin particles, where the fine resin particles contain the surfactant, and the medium;

(ii) a solid-liquid separation step in which the medium in the crude product is removed using a filter medium;

(iii) a washing step in which the fine resin particles are brought into contact with a washing fluid, and then the washing fluid is removed; and (iv) optionally, a drying step and/or a classification step.

Hereinafter, each step of the method for producing the fine resin particle of the present invention will be described in detail.

<Polymerization Step>

In the method of producing the fine resin particle of the present invention, the way of polymerization in the polymerization step is not particularly limited. For example, polymerization methods such as suspension polymerization, seed polymerization, seed emulsion polymerization, emulsion polymerization, soap-free polymerization, miniemulsion polymerization, and dispersion polymerization using a vinylic monomer, a polymerization initiator, and a liquid medium, and optionally a surfactant may be mentioned.

In these polymerization methods, it is a known technique that the addition of various organic solvents and subsequent polymerization enables structural control, etc., of fine resin particles. Nevertheless, it is preferred to perform polymerization in the absence of organic solvents in the present application. In the case of polymerization in the presence of organic solvents, the number of residual reactive groups tends to decrease. This is believed to be due to the fact that the swelling of the polymer chains in the solvent during polymerization increases drivability and increases the frequency of contact with radicals in the system, but is not limited to this hypothesis.

As the vinylic monomer used in the polymerization of the fine resin particle of the present invention, vinylic monomers described in the section of [Fine Resin Particle] may be mentioned.

(Polymerization Initiator)

The polymerization initiator used when the fine resin particle of the present invention is prepared by a polymerization method such as emulsion polymerization, seed emulsion polymerization, or soap-free polymerization is not particularly limited. For example, thermally decomposable water-soluble polymerization initiators are used. Examples of thermally decomposable water-soluble polymerization initiators which may be used include persulfates such as potassium persulfate, ammonium persulfate, lithium persulfate, and sodium persulfate; hydrogen peroxide, and water-soluble azo polymerization initiators. As the water-soluble azo polymerization initiators, polymerization initiators that have been conventionally and universally used for emulsion polymerization, etc., may be used, and newly developed polymerization initiators that are used in emulsion polymerization, etc., may also be used. Examples of water-soluble azo polymerization initiators may be one or two or more selected from the group consisting of VA-080 (2,2'-azobis (2-methyl-N-(1,1-bis(hydroxymethyl)-2-hydroxyethyl)propionamide)), VA-086 (2,2'-azobis(2-methyl-N-(2-hydroxyethyl)-propionamide)), VA-057 (2,2'-azobis(2-(N-(2-carboxyethyl)amidino)propane)), VA-058 (2,2'-azobis(2-(3,4,5,6,-tetrahydropyrimidin-2-yl)propane) dihydrochloride), VA-060 (2,2'-azobis(2-(1-(2-hydroxyethyl)-2-(imidazolin-2-yl)propane)dihydrochloride), V-50 (2,2'-azobis(2-amidinopropane)dihydrochloride), V-501 (4,4'-azobis(4-cyanopentanoic acid)), VA-082 (2,2'-azobis(2-methyl-N-(1,1-bis (hydroxymethyl)ethyl)propionamide)), VA-085 (2,2'-azobis (2-methyl-N-(2-(1-hydroxybutyl))-propionamide)), VA-044 (2,2'-azobis(2-(2-imidazolin-2-yl)propane)dihydrochloride), VA-046B (2,2'-azobis(2-(2-imidazolin-2-yl)propane) disulfate dihydrate), and VA-061 (2,2'-azobis(2-(2-imidazolin-2-yl)propane)) (all of them are manufactured by FUJIFILM Wako Pure Chemical Corporation), 2,2'-azobis (2-amidinopropane) dihydrochloride, 2,2'-azobis(2-(1-(2-hydroxyethyl)-2-imidazolin-2-yl)propane)dihydrochloride, 2,2'-azobis(1-imino-1-pyrrolidino-2-ethylpropane)dihydrochloride, 2,2'-azobis(1-imino-1-pyrrolidino-2-methylpropane)dihydrochloride, 2,2'-azobis(2-methyl-N-(1,1-bis(hydroxymethyl)-2-hydroxyethyl)propionamide), and the like.

A water-soluble azo polymerization initiator is preferred because the influence on the pH of the slurry after polymerization is small, and aggregation of particles and the occurrence of coarse particles due to the reduction of dispersibility can be suppressed. Furthermore, from the viewpoint of improving the dispersibility of fine resin particles, a polymerization initiator with a terminal hydroxy group is preferred.

Furthermore, among water-soluble azo polymerization initiators, a halogen-free water-soluble azo polymerization initiator is preferred from the viewpoint of reducing the conductivity of a fine resin particle dispersion, and VA-086 and VA-057 are particularly preferred because of good water-solubility.

When the fine resin particle of the present invention is prepared by a polymerization method such as suspension polymerization, seed polymerization, or miniemulsion polymerization, a known polymerization initiator may be used without particular limitation, and a thermally decomposable oil-soluble polymerization initiator is preferably used. For example, such polymerization initiators may be one or two or more selected from the group consisting of organic peroxides such as cumene hydroperoxide, di-tert-butyl peroxide, dicumyl peroxide, benzoyl peroxide, lauroyl peroxide, dimethylbis(tert-butylperoxy)hexane, dimethylbis (tert-butylperoxy)hexyne-3, bis(tert-butylperoxyisopropyl) benzene, bis(tert-butylperoxy)trimethylcyclohexane, butyl-bis(tert-butylperoxy)valerate, tert-butyl peroxy-2-ethylhexanoate, dibenzoyl peroxide, p-menthane hydroperoxide, and tert-butyl peroxybenzoate; nitrile-azo compounds such as 2,2'-azobis(isobutyronitrile), 2,2'-azobis (2-methylbutyronitrile), 2,2'-azobis(2-isopropylbutyronitrile), 2,2'-azobis(2,3-dimethylbutyronitrile), 2,2'-azobis(2,4-dimethylbutyronitrile), 2,2'-azobis(2-methylcapronitrile), 2,2'-azobis(2,3,3-trimethylbutyronitrile), 2,2'-azobis(2,4,4-trimethylvaleronitrile), 2,2'-azobis(2,4-dimethylvaleronitrile), 2,2'-azobis(4-methoxy-2,4-dimethylvaleronitrile), 2,2'-azobis(4-ethoxy-2,4-dimethylvaleronitrile), 2,2'-azobis (4-n-butoxy-2,4-dimethylvaleronitrile), 1,1'-azobis(cyclohexane-1-carbonitrile), 2-(carbamoylazo)isobutyronitrile, 4,4'-azobis(4-cyanopentanoic acid); and the like.

The amount of the polymerization initiator used can be determined, as appropriate, depending on the type thereof and is not particularly limited. In relation to 100 parts by mass of the total amount of all monomers used in the polymerization, the amount of the polymerization initiator used is, for example, 0.1 parts by mass or more and preferably 0.3 parts by mass or more, and, for example, 5 parts by mass or less and preferably 3 parts by mass or less.

(Surfactant)

The surfactant which may be optionally used for preparing the fine resin particle of the present invention according to need is not particularly limited.

When the fine resin particle of the present invention is polymerized, an anionic surfactant may be used. Anionic surfactants are classified into reactive surfactants with reactive groups, such as a vinyl group, and non-reactive surfactants without reactive groups.

As anionic non-reactive surfactants, any known anionic surfactants such as fatty acid salt-type, sulfate-type, sulfonate-type, and phosphate-type surfactants may be used. For example, anionic non-reactive surfactants which may be used may be one or two or more selected from the group consisting of alkyl sulfate ester salts such as sodium lauryl sulfate and ammonium lauryl sulfate; alkylbenzene sulfonate salts such as sodium dodecylbenzenesulfonate; dialkyl sulfosuccinate salts such as dioctyl sulfosuccinate sodium salt and di(2-ethylhexyl) sulfosuccinate sodium salt; fatty acid soaps such as sodium oleate and castor oil potassium soap; alkanesulfonate salts; alkenyl succinate salts such as alkenyl succinate (mono or di) sodium salts; alkyl phosphate ester salts; naphthalenesulfonic acid formalin condensate; polyoxyethylene alkyl phenyl ether sulfate ester salts; polyoxyethylene alkyl ether sulfate salts such as sodium polyoxyethylene lauryl ether sulfate; polyoxyethylene alkyl sulfate esters; polyoxyethylene styrenated phenyl ether sulfate ester salts such as polyoxyethylene styrenated phenyl ether sulfate ester ammonium salts; polyoxyethylene alkyl phenyl ether phosphate salts such as polyoxyethylene nonyl phenyl ether phosphate salts (for example, sodium polyoxyethylene nonyl phenyl ether phosphate); and the like. Among them, phosphate ester-based anionic surfactants which may be used may be, for example, at least one selected from commercial products such as PLYSURF (registered trademark) AL, A210G, A208F, etc., manufactured by DKS CO. Ltd., and PHOSPHANOL (registered trademark) LO-529, etc., manufactured by TOHO Chemical Industry Co., Ltd., and salts thereof.

Anionic reactive surfactants may be one or two or more selected from the group consisting of ELEMINOL (registered trademark) JS-20 and RS-3000, manufactured by Sanyo Chemical Industries, Ltd., AQUALON (registered trademark) KH-10, KH-1025, KH-05, HS-10, HS-1025, BC-0515, BC-10, BC-1025, BC-20, BC-2020, AR-1025, and AR-2025, manufactured by DKS CO. Ltd., LATEMUL (registered trademark) S-120, S-180A, S-180, and PD-104, manufactured by Kao Corporation, ADEKA REASOAP (registered trademark) SR-1025 and SE-10N, manufactured by ADEKA Corporation, and the like. Among them, an anionic reactive surfactant with an oxyalkylene chain in the molecular chain is preferred from the viewpoint of improving the dispersibility of the particles.

When the fine resin particle of the present invention is polymerized, nonionic surfactants may be used. Nonionic surfactants are classified into reactive surfactants with reactive groups, such as a vinyl group, and non-reactive surfactants without reactive groups.

As nonionic non-reactive surfactants, any known nonionic surfactants such as ester-type, ether-type, and ester/ether-type surfactants may be used. For example, nonionic non-reactive surfactants may be one or two or more selected from the group consisting of polyoxyalkylene alkyl ethers with an alkylene group containing 3 or more carbon atoms, such as polyoxyalkylene tridecyl ether; fatty acid esters such as sorbitan fatty acid esters, glycerin fatty acid esters, isopropyl palmitate, and sorbitan trioleate; polyoxyethylene styrenated phenyl ether (for example, NOIGEN EA series, manufactured by DKS CO. Ltd.); polyoxyethylene alkyl ether-based surfactants such as polyoxyethylene tridecyl ether; polyoxyethylene alkyl phenyl ether-based surfactants such as polyoxyethylene octyl phenyl ether; polyoxyethylene fatty acid esters; polyoxyethylene sorbitan fatty acid esters such as polyoxyethylene sorbitan monolaurate; polyoxyethylene alkylamines; oxyethylene-oxypropylene block polymers; polyoxyethylene alkyl phenyl ether phosphate esters such as polyoxyethylene nonyl phenyl ether phosphate ester; polyoxyethylene styrenated phenyl ether phosphate esters; polyoxyethylene alkyl ether phosphate esters; and the like.

Nonionic reactive surfactants may be at least one selected from the group consisting of alkyl ether-based nonionic reactive surfactants (for example, ADEKA REASOAP ER-10, ER-20, ER-30, ER-40, manufactured by ADEKA Corporation, LATEMUL PD-420, PD-430, PD-450, manufactured by Kao Corporation, and the like); alkyl phenyl ether-based or alkyl phenyl ester-based nonionic reactive surfactants (for example, AQUALON RN-10, RN-20, RN-30, RN-50, AN-10, AN-20, AN-30, and AN-5065, manufactured by DKS CO. Ltd., ADEKA REASOAP NE-10, NE-20, NE-30, and NE-40, manufactured by ADEKA Corporation, etc.); (meth)acrylate sulfuric acid ester-based nonionic reactive surfactants (for example, RMA-564, RMA-568, and RMA-1114, manufactured by Nippon Nyukazai Co., Ltd., etc.), and the like. Among them, a nonionic reactive surfactant with an oxyalkylene chain in the molecular chain is preferred from the viewpoint of the dispersion stability of the particle.

The amount of the surfactant used is not particularly limited, but, for example, is 0.01 to 10 parts by mass in relation to 100 parts by mass of vinylic monomers. If the total amount of surfactants is less than the range mentioned above, the polymerization stability may be lower, and it may be difficult to achieve the amount of surfactants in fine resin particles. In contrast, if the amount of surfactants used is larger than the range mentioned above, it may be uneconomical in terms of cost, and it may be difficult to adjust the amount of each surfactant in the fine resin particle to the specified range.

(Liquid Medium)

The liquid medium which may be used for preparing the fine resin particle of the present invention is not particularly limited. For example, any of water, organic solvents, and a mixture of these may be used. In the present invention, an aqueous medium is preferred, and, for example, water, a lower alcohol with 5 or fewer carbon atoms, such as methyl alcohol and ethyl alcohol, a mixture of water and a lower alcohol, etc., may be used.

(Polymerization Method)

Polymerization methods of vinylic monomers are not particularly limited. For example, known polymerization methods such as suspension polymerization, emulsion polymerization, seed polymerization, seed emulsion polymerization, soap-free polymerization, miniemulsion polymerization, and dispersion polymerization may be mentioned.

Suspension polymerization can provide fine resin particles with small particle sizes and small variations in particle size (relatively well-defined particle size).

Emulsion polymerization can decrease the variation in particle size of the resulting fine resin particles.

Fine resin particles obtained by seed polymerization have less variation in particle size and can increase optical properties such as anti-glare and light diffusion properties of optical members when used for optical members such as anti-glare films and light diffusion films.

Since the variation in particle size of the resulting fine resin particles is small, suspension polymerization, emulsion polymerization, or seed polymerization is preferred, and seed polymerization is most preferred.

A general procedure of seed polymerization will be described below, but the way of polymerization in the production method of the present invention is not limited to this.

In seed polymerization, an emulsion (suspension) containing an aqueous medium, a vinylic monomer, and a surfactant is first prepared. Here, the aqueous medium is water or a mixture of water and an organic solvent.

To prepare the emulsion (suspension), known methods can be used. For example, an emulsion can be obtained by adding a vinylic monomer and a surfactant to an aqueous medium and dispersing them with a fine emulsifier, such as a homogenizer, a sonicator, or NANOMIZER (registered trademark).

The particle size of the droplets of the vinylic monomer existing in the resulting emulsion is preferably smaller than the particle size of seed particles to be added next because the monomer is efficiently absorbed in seed particles.

Next, seed particles are added to the resulting emulsion (suspension).

Seed particles may be added as they are in an emulsion or may be added in the form of dispersion in an aqueous medium. After adding seed particles to an emulsion, the vinylic monomer is absorbed into the seed particles. As a method for allowing the vinylic monomer to be absorbed into the seed particles, a method of stirring an emulsion at room temperature (about 20° C.) for 1 to 12 hours may normally be mentioned. To promote absorption of the vinylic monomer into the seed particles, the emulsion may be warmed to about 30° C. to 50° C.

When the vinylic monomer is absorbed into seed particles, the seed particles swell. The mixing ratio of the vinylic monomer and the seed particles is preferably such that the vinylic monomer is in the range of 5 to 300 parts by mass in relation to 1 part by mass of the seed particles, for example. The end of absorption of vinylic monomers into seed particles may be judged by observing the particle size with an optical microscope.

Next, the vinylic monomer absorbed in the seed particles is polymerized to prepare fine resin particles. Alternatively, fine resin particles may be obtained by repeating the steps of allowing a vinylic monomer to be absorbed into seed particles and polymerizing the monomer.

In the polymerization of vinylic monomers, a polymerization initiator may optionally be added according to need. A polymerization initiator may be dispersed in an aqueous medium after being mixed with a vinylic monomer in advance, or both a polymerization initiator and a vinylic monomer are separately dispersed in an aqueous medium.

The polymerization temperature and polymerization time of seed polymerization can be selected as appropriate according to the type of vinylic monomer and the type of the polymerization initiator, which may be optionally used according to need. The polymerization temperature is, for example, 25° C. to 110° C., and the polymerization time is, for example, 1 to 12 hours.

The polymerization reaction of the seed polymerization may be performed under an atmosphere of inert gas (for example, nitrogen) that is inert to polymerization.

In the production of the fine resin particle of the present invention, the polymerization reaction of the seed polymerization is preferably performed by raising the temperature after the vinylic monomer and the polymerization initiator, which may be optionally used according to need, have been completely absorbed into seed particles.

In seed polymerization, a polymer dispersion stabilizer may be added to the polymerization reaction system in order to increase the dispersion stability of the fine resin particle. Examples of polymer dispersion stabilizers include polyvinyl alcohol, polycarboxylic acid, celluloses, polyvinyl pyrrolidone, and the like. Furthermore, the polymer dispersion stabilizer and inorganic water-soluble polymer compounds such as sodium tripolyphosphate may be used in combination. Among these polymer dispersion stabilizers, polyvinyl alcohol and polyvinyl pyrrolidone are preferably used. The amount of the polymer dispersion stabilizer added is preferably in the range of 1 to 10 parts by mass in relation to 100 parts by mass of vinylic monomers, for example.

In order to suppress the occurrence of emulsion polymerization products (fine resin particles with a too-small particle size) in an aqueous medium during the polymerization reaction, a water-soluble polymerization inhibitor such as nitrite salts, including sodium nitrite, sulfite salts, hydroquinones, ascorbic acids, water-soluble vitamin Bs, citric acid, or polyphenols may be added to an aqueous medium. If used, the amount of the polymerization inhibitor added is preferably in the range of 0.02 to 0.2 parts by mass in relation to 100 parts by mass of vinylic monomers.

The method for preparing seed particles used in seed polymerization is not particularly limited, and dispersion polymerization, emulsion polymerization, soap-free emulsion polymerization (emulsion polymerization without surfactants as emulsifiers), seed polymerization, suspension polymerization, or the like may be used.

<Solid-Liquid Separation Step>

The solid-liquid separation step in the production of the fine resin particle of the present invention is a step of removing media, etc., from a crude product containing fine resin particles obtained by the polymerization step, a surfactant, and the media using a filter equipped with a filter medium to perform solid-liquid separation of the fine resin particles.

The filter is not particularly limited. For example, a pressure filter equipped with a filter pressure-resistant container, a filter medium placed in the inner bottom of the pressure-resistant container, and a compressed gas supplier that supplies compressed gas into the pressure-resistant container may be used.

The filter medium is not particularly limited as long as fine resin particles can be reliably collected. The filter media may be, for example, one or two or more selected from the group consisting of woven or non-woven filter cloths made of natural or synthetic fibers, wire meshes made of sintered metals, non-woven cloths made of sintered metals, filter plates (porous plates) made of natural fibers or glass fibers, nets made of synthetic resins, filter paper, glass fiber filters, etc., and filter cloths are particularly preferred.

In the solid-liquid separation step, the residual surfactant amount and non-volatile component amount in the fine resin particle can be easily adjusted by controlling the amount of media passing a filter per unit time, the pressurizing condition, the drainage speed when removing the media, or the like.

<Washing Step>

The washing step in the production of the fine resin particle of the present invention is a step of bringing the fine resin particle after the solid-liquid separation step into contact with a washing fluid and then removing the washing fluid to collect washed fine resin particles.

In the washing step, the residual surfactant amount in the fine resin particle, etc., can be controlled by repeating, according to need, the washing steps including immersing cake of fine resin particle obtained by the solid-liquid separation step in washing fluid 10 times or less, preferably 1.5 to 7 times the volume of the cake of fine resin particle, and then removing the washing fluid.

Examples of means for removing the washing fluid include means of repeating the washing steps of removing washing fluid by centrifugal separation using a centrifuge according to need.

Alternatively, means of, for example, bringing the cake of fine resin particle on a filter medium into contact with a washing fluid for washing using a pressure filter can eliminate the short passes of the washing fluid, reduce the amount of the washing fluid used, and allows for more efficient cleaning. The washing fluid may be removed by, for example, a method of bringing the cake into contact with the washing fluid and discharging the washing fluid after washing as filtrate by introducing compressed gas into a pressure filter and pressurizing the pressure filter.

In the washing step, the residual surfactant amount and the non-volatile component amount in the fine resin particle can be adjusted by adjusting the number of centrifugal separations, the amount of washing fluid added, and the amount (discharged amount) of media passing through the filter media, and the like.

The washing fluid used in the washing step is preferably an aqueous medium, and examples thereof include water, lower alcohols with 5 or fewer carbon atoms, such as methyl alcohol and ethyl alcohol, a mixture of these, and the like. In particular, using the same media as those used in the polymerization step is preferred.

The weight of the washing fluid used in the washing step is 10 times or less, preferably 1.5 to 7 times the weight of the fine resin particles to be washed. This can prevent the surfactant from eluting more than necessary during the washing step.

In the washing step, the filtration speed of the washing fluid is not particularly limited and, for example, in the range of 0.025 to 0.095 kg/min·m$^2$.

The temperature of the washing fluid used for washing is the temperature at which the surfactant used in polymerization elutes sufficiently, and, for example, a temperature in the range of 40° C. to 80° C.

It is preferred to end the washing step when the conductivity of the washing fluid passing through filter media reaches 2.0 times or less the conductivity of the washing fluid before feeding into the filter, and the inner pressure of the pressure filter reaches ⅔ or less of the pressure at pressurization.

<Drying Step and Classification Step>

The fine resin particle obtained in the washing step is preferably dried in a drier to remove the washing fluid and classified according to need. The dryer is not particularly limited, but, for example, spray dryers, freeze-dryers, and vacuum agitation dryers incorporating agitator blades (crusher dryers) are preferred, and an appropriate drying apparatus can be selected according to particle size and composition. By drying, the washing fluid can be almost completely removed, and if necessary, the particles can be classified (preferably by airflow classification), whereby fine resin particles available as a product can be obtained.

The drying condition in the present invention is adjusted as appropriate according to the capacity, performance, etc., of the dryer to be used. For example, the degree of vacuum (with respect to atmospheric pressure) may be −0.001 to −0.5 MPa, the drying temperature may be 40° C. to 80° C., and the drying time may be 4 to 10 hours (hr).

In the drying step of the present invention, a surfactant is allowed to elute from the surface of fine resin particles into water, and after that, non-volatile components can be removed together with water using a crusher dryer. This can adjust the residual surfactant amount in the fine resin particle.

For example, the surfactant on the particle surface can be easily adjusted to a specified amount by pre-warming the washed resin particle cake. Furthermore, non-volatile components are sheared off and mostly fractionated in the crushing-drying process. Then, residual surfactants effectively modify the surface of the fine resin particle, and, as a result, fine resin particle with excellent dispersion uniformity and increased dispersibility can be obtained.

According to such a method for producing fine resin particles, residual surfactants attached to fine resin particles in the polymerization step can be removed in appropriate amounts together with media and washing fluid, and furthermore, the non-volatile component content (residual amount) can also be adjusted to an appropriate amount.

[Fine Resin Particle-Containing Composition]

The fine resin particle-containing composition of the present invention contains the fine resin particle of the present invention, a photopolymerization initiator, and a UV curable resin.

<Photopolymerization Initiator>

The photopolymerization initiator in the fine resin particle-containing composition of the present invention is not particularly limited as long as it is a compound that can produce radicals in the composition by irradiation with light or a UV ray and can initiate the polymerization of UV curable resins. It is preferred to use a photopolymerization initiator suitable for a UV-curable resin to be used.

The photopolymerization initiator may be one or two or more selected from the group consisting of, for example, acetophenones, benzoins, benzophenones, phosphine oxides, ketals, α-hydroxyalkylphenones, α-aminoalkylphenones, anthraquinones, thioxanthones, azo compounds, peroxides, 2,3-dialkyldione compounds, disulfide compounds, fluoroamine compounds, aromatic sulfoniums, onium salts, borate salts, active halogen compounds, α-acyloxime esters, and the like.

In relation to 100 parts by mass of UV-polymerizable resins, the amount of the photopolymerization initiator used is, for example, 0.5 parts by mass or more and preferably 1.0 part by mass or more, and, for example, 20.0 parts by mass or less and preferably 5.0 parts by mass or less.

<UV Curable Resin>

The UV curable resin in the fine resin particle-containing composition of the present invention is selected, as appropriate, according to required characteristics, such as transparency, dispersibility of fine resin particles, light-resistance, moisture resistance, and heat resistance, and is not particularly limited. For example, those containing one or two or more selected from the group consisting of multifunctional (meth)acrylate resins, multifunctional urethane (meth)acrylate resins, multifunctional polyester (meth)acrylate resins, epoxy(meth)acrylate resins, alkyd resins, and the like may be mentioned.

UV curable resins are preferably those containing multifunctional (meth)acrylate resins, and more preferably those including polyhydric alcohol multifunctional (meth)acrylates with 3 or more (meth)acryloyl groups in one molecule. Polyhydric alcohol multifunctional (meth)acrylates with 3 or more (meth)acryloyl groups in one molecule may be, for example, one or two or more selected from the group consisting of trimethylolpropane tri(meth)acrylate, trimethylolethane tri(meth)acrylate, 1,2,4-cyclohexane tri(meth)acrylate, pentaglycerol triacrylate, pentaerythritol tetra(meth)acrylate, pentaerythritol tri(meth)acrylate, dipentaerythritol triacrylate, dipentaerythritol pentaacrylate, dipentaerythritol tetra(meth)acrylate, dipentaerythritol hexa(meth)acrylate, tripentaerythritol triacrylate, tripentaerythritol hexaacrylate, and the like.

The fine resin particle-containing composition may contain other components than the fine resin particle, a photopolymerization initiator, and a UV curable resin according to need.

For example, the fine resin particle-containing composition may contain a resin other than the fine resin particle and UV curable resins (one or two or more selected from the group consisting of cellulose-based resins, vinylic resins such as vinyl acetate-based resins, vinyl chloride-based resins, vinylidene chloride-based resins, acetal-based resins, (meth)acrylic resins, polystyrene-based resins, polyamide resins, linear polyester resins, polycarbonate resins, and the like).

Furthermore, the fine resin particle-containing composition may contain a reactive diluent as a solvent, for example. The reactive diluent may be one or two or more vinylic monomers. The vinylic monomer used as the reactive diluent may be, for example, one or two or more selected from monofunctional (meth)acrylic monomers and multi-functional (meth)acrylic monomers used for the polymerization of the fine resin particles of the present application.

Furthermore, the fine resin particle-containing composition may contain inorganic particles such as silica, a coloring agent, an organic solvent, and the like. It should be noted that trace amounts of organic solvents are preferred, and it is normally preferred that no organic solvents are used.

The amount of the fine resin particles in the fine resin particle-containing composition is not particularly limited. In relation to 100 parts by mass of the solid content in the UV curable resin, the amount of the fine resin particles is, for example, 2 parts by mass or more, preferably 4 parts by mass or more, and more preferably 6 parts by mass or more, and 300 part by mass or less, preferably 200 parts by mass or less, and more preferably 100 parts by mass or less.

By setting the amount of the fine resin particles to 2 parts by mass or more in relation to 100 parts by mass of the solid content of UV curable resin, optical properties such as a matting property of the layer (coating film) formed by the fine resin particle-containing composition can be exhibited sufficiently, and optical properties such as anti-glare and light diffusion properties of optical members formed by coating the fine resin particle-containing composition on a substrate can be fully realized. In contrast, by setting the amount to 300 parts by mass or less, it is easier to make the linear permeability of the layer (coating film) formed by the fine resin particle-containing composition sufficient.

The method for applying the fine resin particle-containing composition to a substrate is not particularly limited. For example, known coating methods such as bar coating, blade coating, spin coating, reverse coating, die coating, spray coating, roll coating, gravure coating, micro-gravure coating, lip coating, air knife coating, and dip coating may be used.

After the fine resin particle-containing composition is applied to form a resin composition layer on a substrate, the layer can be irradiated with active energy rays to dry and cure the layer.

For example, active energy rays may be LED, UV rays emitted from a light source such as a high-pressure mercury lamp, infrared rays, electron beams emitted from an electron beam accelerator, α-ray, β-ray, γ-ray, and the like.

The thickness (dry thickness) of the layer (coating film) formed by the fine resin particle-containing resin composition is not particularly limited and can be adjusted, as appropriate, according to the purpose, required characteristics, and the like. The thickness is, for example, 1 μm or larger and preferably 3 μm or larger, and, for example, 10 μm or smaller and preferably 7 μm or smaller.

[Applications of Fine Resin Particle]

The fine resin particle of the present invention can be used in various applications other than the fine resin particle-containing composition mentioned above. For example, a molding resin composition containing fine resin particles and a resin is prepared, and optical films, such as anti-glare films and light diffusion films, and optical members, such as light diffusers, in particular, anti-glare members, can be obtained from this molding resin composition.

For example, a resin-molded article can be obtained by molding fine resin particles themselves or a mixture of the fine resin particles with resins.

For example, an optical member can be formed by coating a layer of the fine resin particle-containing composition mentioned above on a substrate. For example, the optical member may be a light diffusion film or an anti-glare film for light diffusion or anti-glare.

The substrate is preferably transparent. Transparent substrates may be, for example, substrates of glass, polyester-based resins, cellulose-based resins, polycarbonate-based resins, (meth)acrylic resins, cyclic polyolefin-based resins, a mixture containing one or two or more of these resins, laminated products of these resins, and the like. Among these, those with a low birefringence index are particularly preferred.

Furthermore, a laminate in which an easily adhesive layer such as a (meth)acrylic resin or a polyurethane-based resin is disposed on at least one surface of these substrates may be used as a substrate.

The thickness of a substrate can be determined as appropriate and generally in the range of 10 to 500 μm in view of strength, workabilities such as handleability, thinness, and the like. The thickness is preferably 20 to 300 μm and more preferably 30 to 200 μm.

The substrate may contain an additive. The additive may be, for example, a UV absorber, an infrared absorber, an antistatic agent, a refractive index modifier, an enhancer, and the like.

For example, a resin molded body may be prepared by various molding methods using the fine resin particle of the present invention singly or as a mixture with other resins. The other resins may be preferably transparent resins, and the fine resin particles can function as light diffusion particles in the resin molded body.

The resin molded body functions as a light diffuser, such as a light diffusing plate, and can be used as a LED illumination cover.

The transparent resin may be, for example, one or two or more selected from the group consisting of (meth)acrylic resins, polycarbonate-based resins, polystyrene-based resins, (meth)acryl-styrene-based resins (copolymers of (meth) acrylic acid esters and styrene), and the like. Among them, a polystyrene-based resin or a (meth)acryl-styrene-based resin is preferred.

When a resin molded body is prepared from the fine resin particle of the present invention and a transparent resin, the amount of the fine resin particles in a resin molded body may be in the range of 0.01 to 5 parts by mass, preferably 0.1 to 5 parts by mass in relation to 100 parts by mass of transparent resins. The resin molded body may optionally contain an additive such as a UV absorber, an antioxidant, a heat stabilizer, a light stabilizer, or a fluorescent brightener according to need.

The thickness, shape, etc., of a resin molded body can be selected as appropriate depending on the type of use.

The resin molded body can be obtained by melt-kneading the transparent resin and the fine resin particle with a single screw extruder, a twin screw extruder, or the like. Alternatively, a resin composition obtained by melt-kneading may be shaped into a sheet-like shape through a T-die and a roll unit to obtain a resin molded product. Alternatively, a resin composition obtained by melt-kneading may be pelletized, and the pellets are then molded by injection molding, press molding, or the like to obtain a resin molded product.

A resin molded body containing the fine resin particle of the present invention is excellent in dispersion uniformity of fine resin particles, and optical characteristics such as even and uniform light diffusion and anti-glare properties, etc., are exhibited.

EXAMPLES

The present invention will be specifically described below with Examples and Comparative Examples, but the present invention is not limited to these. Unless otherwise specified, "%" means "% by mass", and "part(s)" means part(s) by mass.

[Measuring Method]

<Maximum Absorbance and Absorbance Ratio>

The maximum absorbance and the absorbance ratio were measured using a Fourier transform infrared spectrometer, "Nicolet iS10", manufactured by Thermo Fisher Scientific_Inc., to which "Smart-iTR", manufactured by Thermo Fisher Scientific Inc., was connected as an ATR accessory.

The conditions for infrared spectroscopy ATR measurement are as follows.

(Measurement Condition)

- Measurement device: Fourier transform infrared spectrometer Nicolet iS10 (manufactured by Thermo Fisher Scientific Inc.) and single reflection horizontal ATR, Smart-iTR (manufactured by Thermo Fisher Scientific Inc.)
- ATR crystal: Diamond with ZnSe lens, angle=42°
- Measuring method: Single ATR method
- Measurement wavenumber region: 4000 cm-1 to 650 cm-1
- Wavenumber dependence of measured depth: Not corrected
- Detector: Deuterated triglycine sulfate (DTGS) detector and KBr beam splitter-Resolution: 4 cm-1
- Cumulative number: 16 times (The same applies to background measurements.)

In an ATR method, the intensity of an infrared absorption spectrum obtained by the measurement changed depending on the degree of adhesion between a sample and a high refractive index crystal. Thus, the measurement was performed while applying the maximum load that could be applied by the "Smart-iTR" of the ATR accessory to make the degree of adhesion nearly uniform.

The infrared absorption spectrum obtained in the condition described above was processed as follows, and the maximum peak height (maximum absorbance) (A) in a wavenumber range from 1700 $cm^{-1}$ to 1800 $cm^{-1}$ and the maximum peak height (maximum absorbance) (B) in a wavenumber range from 1600 $cm^{-1}$ to 1700 $cm^{-1}$ were determined.

The maximum absorbance (A) in a wavenumber range from 1700 $cm^{-1}$ to 1800 $cm^{-1}$ obtained from the infrared absorption spectrum was an absorbance corresponding to the absorption spectrum derived from the C═O stretching vibration of an ester group. In this measurement of absorbance, peak separation was not performed even if other absorption spectra overlapped in the range from 1700 $cm^{-1}$ to 1800 $cm^{-1}$. The absorbance (A) means the maximum absorbance between 1700 $cm^{-1}$ and 1800 $cm^{-1}$ determined by setting a straight line connecting 1700 $cm^{-1}$ and 1800 $cm^{-1}$ to the baseline.

The maximum absorbance (B) in the range from 1600 $cm^{-1}$ to 1700 $cm^{-1}$ was an absorbance corresponding to the absorption spectrum derived from the alkene C═C stretching vibration. In this measurement of absorbance, peak separation was not performed even if other absorption spectra overlapped in the range from 1600 $cm^{-1}$ to 1700 $cm^{-1}$. The absorbance (B) means the maximum absorbance between 1600 $cm^{-1}$ and 1700 $cm^{-1}$ determined by setting a straight line connecting 1600 $cm^{-1}$ and 1700 $cm^{-1}$ to the baseline.

As stated above, the maximum peak height (maximum absorbance) (A) in a wavenumber range from 1700 $cm^{-1}$ to 1800 $cm^{-1}$ and the maximum peak height (maximum absorbance) (B) in a wavenumber range from 1600 $cm^{-1}$ to 1700 $cm^{-1}$ were obtained from the infrared spectrum of the fine resin particles measured by an ATR method using an infrared spectrophotometer, and the absorbance ratio was calculated from the following (Formula 1).

$$\text{Absorbance ratio}=(B)/(A) \quad \text{(Formula 1)}$$

<Moisture Content>

Coulometric titration was performed according to a Karl Fischer method in accordance with JIS K 0113 using a coulometric titration method moisture meter (Model CA-310, manufactured by Mitsubishi Chemical Analytech Co., Ltd.) to measure the moisture content of fine resin particles.

<Amount of Unreacted Vinylic Monomer in Fine Resin Particle>

To 0.01 g of fine resin particle, 5 mL of methanol is added, thoroughly mixed, and allowed to stand for 24 hours to obtain a dispersion solution. Next, the dispersion is treated by a centrifuge for 30 minutes at a stirring rotation number of 18,500 rpm to precipitate undissolved matters. A portion of 2 μL of the resulting supernatant is analyzed by an ultra-high-performance liquid chromatogram, La Chrom Ultra (manufactured by Hitachi High-Technologies Corporation), to measure a residual monomer amount to the fine resin particle.

Measurement conditions are as follows: La Chrom Ultra C18 2 μm is used as a column, and the column temperature was set to 40° C. As a solvent, a mixture of 0.05% aqueous trifluoroacetic acid solution and acetonitrile (50/50 w/w) was used, and the flow rate was set to 0.6 mL/min.

<Evaluation of Stickiness>

Two parts of fine resin particles were added to a mixture of 55 parts of pentaerythritol triacrylate as a binder and 38 parts of acryloylmorpholine, and the resulting mixture was stirred and mixed. Furthermore, 5 parts of Irgacure 184 was added as a photopolymerization initiator, then the mixture was applied to a PET film with an applicator such that the film thickness be 10 μm, and the resulting film was irradiated with UV light at 400 $mJ/cm^2$ from a metal halide lamp to prepare a coated product with a coated film on the PET film. After the lapse of one week at room temperature, stickiness was evaluated by the following stickiness evaluation test.

(Stickiness Evaluation Test)

While applying a load of 200 g, a #1000 steel wool was moved back and forth 10 times over the coating film, and the powder that appeared on the coating film was visually observed and evaluated. A sample in which no resin particulate desorption was observed was designated "A", and a sample in which resin particulate desorption was observed was designated <Residual Surfactant Amount>

The fine resin particle was extracted using a solvent, and the residual surfactant amount was measured using a liquid chromatograph linear ion trap mass spectrometer (LC/MS/MS spectrometer).

As LC/MS/MS spectrometers, "UHPLC ACCELA", manufactured by Thermo Fisher Scientific Inc., and "Linear Ion Trap LC/MSn LXQ", manufactured by Thermo Fisher Scientific Inc., were used.

A surfactant content is measured in a manner described in the following.

After weighing about 0.01 g of a fine resin particle in a centrifuge tube, the extractant was poured into the tube, the fine resin particle and the extractant were mixed well, extracted using ultrasonic waves, mixed again, and centrifuged, and the resulting supernatant liquid was filtered to make a test solution.

The concentration of surfactants in the test solution was determined using an LC/MS/MS spectrometer, and the content was calculated from a calibration curve prepared in advance from the peak area values on the obtained chromatogram. Then, the surfactant content in the fine resin particle was determined from the measured surfactant concentration in the test solution, the weight of the fine resin particle used as the sample (sample weight), and the amount of extracted solution using the following equation.

Surfactant content=Surfactant concentration in test solution×Amount of extracted solution/Sample weight The calibration curve is prepared in the following manner.

An intermediate standard solution (methanol solution) of about 1,000 ppm by mass of a surfactant was prepared, and after that, the intermediate standard solution was further diluted with methanol stepwise to prepare standard solutions for calibration curve preparation of 20 ppm by mass, 10 ppm by mass, 5 ppm by mass, and 2.5 ppm by mass. The standard solutions for calibration curve preparation of respective concentrations were measured under the below conditions to obtain peak area value on a chromatogram of a monitor ion m/z=730 to 830. Each concentration and area value were plotted to obtain an approximate curve (quadratic curve) by a least square method, and the resulting curve was used as a calibration curve for quantification.

<Volume Average Particle Size and Number Average Particle Size>

The volume average particle size and the number average particle size of fine resin particles were measured by a laser diffraction/scattering particle size distribution analyzer (model "LS 230", manufactured by Beckman Coulter, Inc.). Specifically, 0.1 g of an aqueous fine resin particle dispersion (solid content: 20%) and 20 ml of 2% by mass of an anionic surfactant solution were put in a test tube. After that, the fine resin particles were dispersed over 5 minutes using a test tube mixer ("test tube mixer TRIO HM-1N", manufactured by AS ONE Corporation) and an ultrasonic cleaner ("ULTRASONIC CLEANER VS-150", manufactured by AS ONE Corporation) to prepare a dispersion. The resulting dispersion was irradiated with ultrasound in the laser diffraction/scattering particle size distribution analyzer (model "LS 230", manufactured by Beckman Coulter, Inc.), and the volume average particle size and the number average particle size of fine resin particles in the dispersion were measured in the following conditions.

<Measurement Conditions of Laser Diffraction/Scattering Particle Size Distribution Analyzer>

Medium=water

Refractive index of medium=1.333

Refractive index of solid=refractive index of fine resin particle

PIDS relative concentration: 40% to 55%

The optical model for the measurement was matched to the refractive index of the produced resin particles. When a single type of monomer was used in the production of the fine resin particle, the refractive index of the homopolymer of the monomer was used as the refractive index of the fine resin particle. When plural types of monomers were used in the production of a fine resin particle, an average obtained by weighting and averaging the refractive indexes of homopolymers of each monomer by the amount of each monomer used was used as the refractive index of fine resin particle.

A volume-based particle size distribution of the fine resin particles was obtained from the measurement result. The arithmetic mean of the volume-based particle size distribution was regarded as the volume average particle size of the fine resin particles.

<Coefficient of Variation of Volume Average Particle Size>

The coefficient of variation (CV value) of the volume average particle size of fine resin particles was calculated from the following equation.

Coefficient of variation of volume average particle size of fine resin particles=[(Standard deviation of volume-based particle size distribution of fine resin particles)/(Volume average particle size of fine resin particles)]×100

Example 1

[Method of Producing Fine Resin Particle]

In a polymerization vessel equipped with a stirring device, a thermometer, and a cooling mechanism, 320 parts of deionized water and 0.2 parts of AQUALON AR-1025 (manufactured by DKS CO. Ltd.) were mixed. In another container, 3.8 parts of methyl methacrylate and 0.2 parts of ethylene glycol dimethacrylate were mixed and then fed into the polymerization vessel, and the resulting mixture was stirred for 10 minutes at 8,000 rpm using T.K. HOMOMIXER (manufactured by PRIMIX Corporation) to prepare a monomer mixture. The polymerization vessel was purged with nitrogen for 5 minutes, and the temperature was raised to 85° C. When the temperature reached 85° C., 0.2 parts of VA-086 (manufactured by FUJIFILM Wako Pure Chemical Corporation), which was dissolved in 10 parts of deionized water, was added, and the reaction was continued for one hour to prepare a slurry (1).

Next, in a container other than the one used earlier, 36 parts of deionized water, 0.3 parts of AQUALON AR-1025 (manufactured by DKS CO. Ltd.), and 0.03 parts of AQUALON AN-5065 (manufactured by DKS CO. Ltd.) were mixed to prepare a surfactant solution. Furthermore, in another container, 36 parts of ethylene glycol dimethacrylate was thoroughly mixed, and then fed into the surfactant solution. The resulting mixture was stirred for 10 minutes at 8,000 rpm using T.K. HOMOMIXER (manufactured by PRIMIX Corporation) to prepare a monomer mixture (2).

The monomer mixture (2) was fed portionwise in eight portions over 2 hours to a slurry (1) held at 85° C. in the polymerization vessel. After that, the slurry was aged for one hour, then the temperature of the slurry was raised to 100° C., held at the same temperature for 3 hours, and then cooled to prepare a fine resin particle-containing slurry.

The fine resin particle-containing slurry was passed through a mesh of 400 Mesh to classify the fine resin particles, thereby preparing a classified fine resin particle slurry.

The classified fine resin particle slurry was spray-dried under the apparatus conditions described below using a spray dryer (manufactured by Sakamoto Giken K.K., machine name: Spray Dryer, model: Atomizer take-up system, model number: TRS-3WK) to prepare aggregates of fine resin particles.

<Apparatus Conditions>

Feeding rate of slurry containing fine resin particles: 25 mL/min

Rotation number of atomizer: 12,000 rpm

Airflow: 2 $m^3$/min

Inlet temperature (the temperature of the slurry inlet containing fine resin particles provided in the spray dryer into which the slurry containing the fine resin particles was sprayed and introduced): 150° C.

Outlet temperature (the temperature of the powder outlet provided in the spray dryer from which the aggregate of the fine vinylic resin particles was discharged): 70° C.

The resulting fine resin particle aggregate was crushed using a current jet mill (manufactured by Nisshin Engineering Inc., trade name: CJ-10, crushing air pressure: 0.5 MPa), and as a result, the target fine resin particle was obtained.

<Physical Properties of Fine Resin Particle>

The volume average primary particle size of the resulting fine resin particles was 183 nm, and the coefficient of variation was 20.8%. In an infrared spectrum measured by an ATR method with an infrared spectrophotometer, the maximum peak height (maximum absorbance) (A) in a wavenumber range from 1700 $cm^{-1}$ to 1800 $cm^{-1}$ was found to be 0.1921, and the maximum peak height (maximum absorbance) (B) in a wavenumber range from 1600 $cm^{-1}$ to 1700 $cm^{-1}$ was found to be 0.00965, and the absorbance ratio (B)/(A) was 0.05023.

The evaluation of the stickiness test was ranked A.

Table 1 shows the physical properties and evaluation results of the resulting fine resin particles.

Example 2

The target fine resin particle was obtained by the treatment in the same condition as in Example 1 except that, in the production condition of the fine resin particle described in Example 1, 36 parts of ethylene glycol dimethacrylate used for preparing the monomer mixture (2) was changed to 34 parts of ethylene glycol dimethacrylate and 2 parts of styrene.

Table 1 shows the physical properties and evaluation results of the resulting fine resin particles.

Example 3

The target fine resin particle was obtained by the treatment in the same condition as in Example 1 except that, in the production condition of the fine resin particle described in Example 1, 36 parts of ethylene glycol dimethacrylate used for preparing the monomer mixture (2) was changed to 24 parts of ethylene glycol dimethacrylate and 12 parts of methyl methacrylate.

Table 1 shows the physical properties and evaluation results of the resulting fine resin particles.

Example 4

In a polymerization vessel equipped with a stirring device, a thermometer, and a cooling mechanism, 6 parts of magnesium pyrophosphate and 0.04 parts of sodium lauryl sulfate were mixed with 70 parts of deionized water. In another container, 20 parts of ethylene glycol dimethacrylate and 0.12 parts of 2,2'-azobis(2,4-dimethylvaleronitrile) were thoroughly mixed and then fed into the polymerization vessel, and the resulting mixture was stirred for 5 minutes at 7,000 rpm using T.K. HOMOMIXER (manufactured by PRIMIX Corporation) to prepare a monomer mixture. Furthermore, the resulting monomer mixture was treated with a microfluidizer at 20 MPa and fed into the polymerization vessel again. The polymerization vessel was purged with nitrogen for 5 minutes, and the temperature was raised to 55° C., and the reaction was performed over 4 hours. After that, the reaction mixture was aged for 1 hour, the temperature was then raised to 100° C., and the polymerization was performed over 3 hours. After the resulting fine resin particle-containing slurry was cooled and removed, the particles and supernatant liquid were separated in a centrifuge, and only the supernatant liquid was removed. After the resulting particles were re-dispersed in deionized water, washing steps including separating the particles and supernatant liquid in a centrifuge and then removing the supernatant liquid, which were performed in the same manner, were repeated. The washing step ended when the conductivity of the supernatant liquid reached 15 μS or less. The resulting particle was dried in a vacuum oven to prepare dried powder. The resulting dried powder was airflow classified using a Turbo Classifier (manufactured by Nissin Engineering Inc.) to obtain the target resin particles.

Table 1 shows the physical properties and evaluation results of the resulting fine resin particles.

Example 5

The target fine resin particle was obtained by the treatment in the same condition as in Example 4 except that, in the production condition of the fine resin particle described in Example 4, 20 parts of ethylene glycol dimethacrylate used for preparing the monomer mixture (2) was changed to 18 parts of ethylene glycol dimethacrylate and 2 parts of pentaerythritol tetrakis(thioglycolate).

Table 1 shows the physical properties and evaluation results of the resulting fine resin particles.

Comparative Example 1

The target fine resin particle was obtained by the treatment in the same condition as in Example 1 except that, in the production condition of the fine resin particle described in Example 1, 36 parts of ethylene glycol dimethacrylate used for preparing the monomer mixture (2) was changed to 8 parts of ethylene glycol dimethacrylate and 28 parts of methyl methacrylate.

Table 1 shows the physical properties and evaluation results of the resulting fine resin particles.

Comparative Example 2

The target fine resin particle was obtained by the treatment in the same condition as in Example 4 except that, in the production condition of the fine resin particle described in Example 4, 20 parts of ethylene glycol dimethacrylate used for preparing the monomer mixture (2) was changed to 4 parts of ethylene glycol dimethacrylate and 16 parts of methyl methacrylate.

Table 1 shows the physical properties and evaluation results of the resulting fine resin particles.

Table 1 shows the volume average particle size, coefficient of variation, maximum absorbance (A), maximum absorbance (B), absorbance ratio (B)/(A), moisture content, the total amount of unreacted vinylic monomers, residual surfactant amount, and the results of the stickiness test of the resulting fine resin particles of Examples 1 to 5 and Comparative Examples of 1 and 2.

TABLE 1

| | Example 1 | Example 2 | Example 3 | Example 4 | Example 5 | Comparative Example 1 | Comparative Example 2 |
|---|---|---|---|---|---|---|---|
| Maximum absorbance (A) | 0.1921 | 0.1933 | 0.1628 | 0.2348 | 0.1874 | 0.1634 | 0.1921 |
| Maximum absorbance (B) | 0.0096 | 0.0092 | 0.0049 | 0.0090 | 0.0055 | 0.0027 | 0.0031 |
| Absorbance ratio (B)/(A) | 0.050 | 0.048 | 0.030 | 0.038 | 0.029 | 0.017 | 0.016 |
| Total amount of unreacted vinylic monomers (%) | 0.02 | 0.02 | 0.13 | 0.12 | 0.09 | 0.21 | 0.23 |
| Moisture content (%) | 0.25 | 0.24 | 0.24 | 0.15 | 0.16 | 0.23 | 0.13 |
| Stickiness test | A | A | A | A | A | D | D |
| Residual surfactant amount (%) | 0.11 | 0.12 | 0.11 | 0.08 | 0.07 | 0.11 | 0.08 |
| Volume average particle size (μm) | 0.183 | 0.185 | 0.184 | 3.700 | 4.100 | 0.183 | 3.500 |
| Coefficient of variation (%) | 20.8 | 19.7 | 18.8 | 31.3 | 30.1 | 19.8 | 29.8 |

The present invention can be implemented in various other forms without departing from the spirit or main features thereof. Thus, the Examples described above are merely illustrative in all respects and must not be interpreted restrictively. The scope of the present invention is indicated by the claims and is not bound by the text of the description in any way. Furthermore, variations and modifications belonging to the equivalents of the claims are all within the scope of the present invention.

The invention claimed is:

1. A fine resin particle obtained by polymerizing one or two or more vinylic monomers and, in an infrared spectrum measured by an ATR method with an infrared spectrophotometer, having an absorbance ratio (B)/(A) in a range of 0.020 to 0.060 between a maximum peak height (maximum absorbance) (A) in a wavenumber range from 1700 $cm^{-1}$ to 1800 $cm^{-1}$ and a maximum peak height (maximum absorbance) (B) in a wavenumber range from 1600 $cm^{-1}$ to 1700 $cm^{-1}$, wherein the vinylic monomers include a multifunctional vinylic monomer, and wherein the fine resin particle satisfies at least one of the following requirements (a) to (c):

(a) an amount of unreacted vinylic monomer in the fine resin particle is 1.0% by mass or less;

(b) a residual surfactant amount in relation to 100 parts by mass of the fine resin particle is 0.01 parts by mass or more and 1 part by mass or less; and (c) a content of the multifunctional vinylic monomer is in a range of 51 parts by mass to 100 parts by mass in relation to 100 parts by mass of the vinylic monomers.

2. The fine resin particle according to claim 1, wherein the vinylic monomers include a (meth)acrylic acid ester-based monomer.

3. The fine resin particle according to claim 1, wherein the content of the multifunctional vinylic monomer is in a range of 70 parts by mass to 100 parts by mass in relation to 100 parts by mass of the vinylic monomers.

4. The fine resin particle according to claim 1, wherein the fine resin particle is a dried powder with a moisture content of 2.0 parts by mass or less.

5. A fine resin particle-containing composition comprising the fine resin particle according to claim 1, a photo-polymerization initiator, and a UV curable resin.

* * * * *